US008756535B2

(12) United States Patent
Sudhakar

(10) Patent No.: US 8,756,535 B2
(45) Date of Patent: Jun. 17, 2014

(54) SIMULTANEOUS SCREEN SAVER OPERATIONS

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 1465 days.

(21) Appl. No.: 12/272,024

(22) Filed: Nov. 17, 2008

(65) Prior Publication Data

US 2010/0125819 A1 May 20, 2010

(51) Int. Cl.
*G06F 3/048* (2013.01)
*G09G 5/00* (2006.01)
*G09G 3/00* (2006.01)

(52) U.S. Cl.
CPC .............. *G09G 5/00* (2013.01); *G09G 5/005* (2013.01); *G09G 3/006* (2013.01); *G09G 5/006* (2013.01)
USPC ........... 715/867; 715/759; 715/764; 715/778; 715/827; 345/618; 345/628; 345/636

(58) Field of Classification Search
CPC ......... G09G 5/00; G09G 5/005; G09G 5/006; G09G 3/006
USPC .......... 715/867, 827, 759, 764, 778; 345/618, 345/628, 636
See application file for complete search history.

(56) References Cited

U.S. PATENT DOCUMENTS

| | | | |
|---|---|---|---|
| 5,498,002 A * | 3/1996 | Gechter | 463/31 |
| 6,043,818 A * | 3/2000 | Nakano et al. | 715/851 |
| 6,160,213 A * | 12/2000 | Arnold et al. | 84/615 |
| 6,353,449 B1 * | 3/2002 | Gregg et al. | 715/762 |
| 6,486,900 B1 * | 11/2002 | Shen et al. | 715/867 |
| 6,903,743 B2 * | 6/2005 | Ng | 345/473 |
| 7,072,683 B2 * | 7/2006 | King et al. | 455/550.1 |
| 7,162,263 B2 * | 1/2007 | King et al. | 455/550.1 |
| 7,194,703 B2 * | 3/2007 | Yokomizo | 715/867 |
| 7,278,093 B2 * | 10/2007 | Jablonski et al. | 715/205 |
| 7,315,989 B2 * | 1/2008 | Medvedev et al. | 715/867 |
| 7,596,768 B2 * | 9/2009 | Nakayama | 715/867 |
| 7,979,319 B2 * | 7/2011 | Toulotte | 705/26.7 |
| 2003/0083108 A1 * | 5/2003 | King et al. | 455/566 |
| 2004/0075701 A1 * | 4/2004 | Ng | 345/867 |

(Continued)

FOREIGN PATENT DOCUMENTS

| | | | | |
|---|---|---|---|---|
| JP | 2002082734 A | * | 3/2002 | |
| JP | 2002-310708 | * | 10/2002 | G01C 21/00 |
| KR | 2006-006955 | * | 12/2004 | |

OTHER PUBLICATIONS

Brown et al.; CWIC: Continuous Web Image Collector; 2000; 8 pages.*

(Continued)

*Primary Examiner* — Linh K Pham
(74) *Attorney, Agent, or Firm* — Schwegman, Lundberg & Woessner, P.A.

(57) ABSTRACT

Apparatus, systems, and methods may operate to execute a plurality of screen saver program instances to display a plurality of separately visible screen saver images using a single display device at substantially the same time. In some embodiments, some or all of the screen saver images are displayed in a plurality of non-overlapping display compartments. The images may be selectively assigned a dominant color, or color scheme. The compartments may have boundaries that can be selectively revised. Additional apparatus, systems, and methods are disclosed.

24 Claims, 6 Drawing Sheets

(56) References Cited

U.S. PATENT DOCUMENTS

| | | | |
|---|---|---|---|
| 2005/0144251 A1* | 6/2005 | Slate | 709/215 |
| 2005/0265609 A1* | 12/2005 | Morishige | 382/235 |
| 2006/0195802 A1* | 8/2006 | Nakayama | 715/867 |
| 2007/0174421 A1* | 7/2007 | Dunham | 709/217 |
| 2007/0201048 A1* | 8/2007 | DuBois | 358/1.1 |
| 2007/0277127 A1* | 11/2007 | Carlson et al. | 715/867 |
| 2007/0278320 A1* | 12/2007 | Lunacek et al. | 236/94 |
| 2008/0004506 A1* | 1/2008 | Ikeda et al. | 600/300 |
| 2008/0026798 A1* | 1/2008 | Kim | 455/566 |
| 2008/0065992 A1* | 3/2008 | Ma et al. | 715/720 |
| 2008/0129649 A1* | 6/2008 | Shelby et al. | 345/1.3 |
| 2008/0229257 A1* | 9/2008 | White | 715/867 |
| 2008/0276204 A1* | 11/2008 | Lowles | 715/867 |
| 2009/0031247 A1* | 1/2009 | Walter et al. | 715/788 |
| 2009/0158222 A1* | 6/2009 | Kerr et al. | 715/867 |
| 2009/0217212 A1* | 8/2009 | Madar et al. | 715/867 |
| 2010/0060789 A1* | 3/2010 | Aoki et al. | 348/563 |
| 2010/0107128 A1* | 4/2010 | Thukral | 715/867 |

OTHER PUBLICATIONS

Axialis Software; Axialis Professional Screen Saver Producer 3.61; Copyright 1996-2004; Corporate Edtion; 234 pages.*

"e-motional.com software: Images in Motion", http://www.e-motional.com/AllSaver.htm, Esm Software—Screenshots from website, (Copyright 1999-2003).

* cited by examiner

SIMULTANEOUS SCREEN SAVER OPERATIONS

BACKGROUND

Most operating systems have the option of allowing a single screen saver program to operate. Some permit the selection of the program to be used, and/or the image to be displayed.

SUMMARY

In various embodiments, apparatus, systems, and methods that support the display of multiple, simultaneous screen saver images (resulting from the simultaneous execution of multiple screen saver program instances) are provided. For example, in some embodiments, this type of display is enabled by executing multiple screen saver program instances and displaying a corresponding plurality of separately visible screen saver images using a single display device at substantially the same time. The images may be selectively assigned a dominant color, or color scheme. The images may be displayed within compartments having boundaries that can be selectively revised. Additional embodiments are described, and along with the foregoing example, will be set forth in detail below.

DETAILED DESCRIPTION

Figure 1:
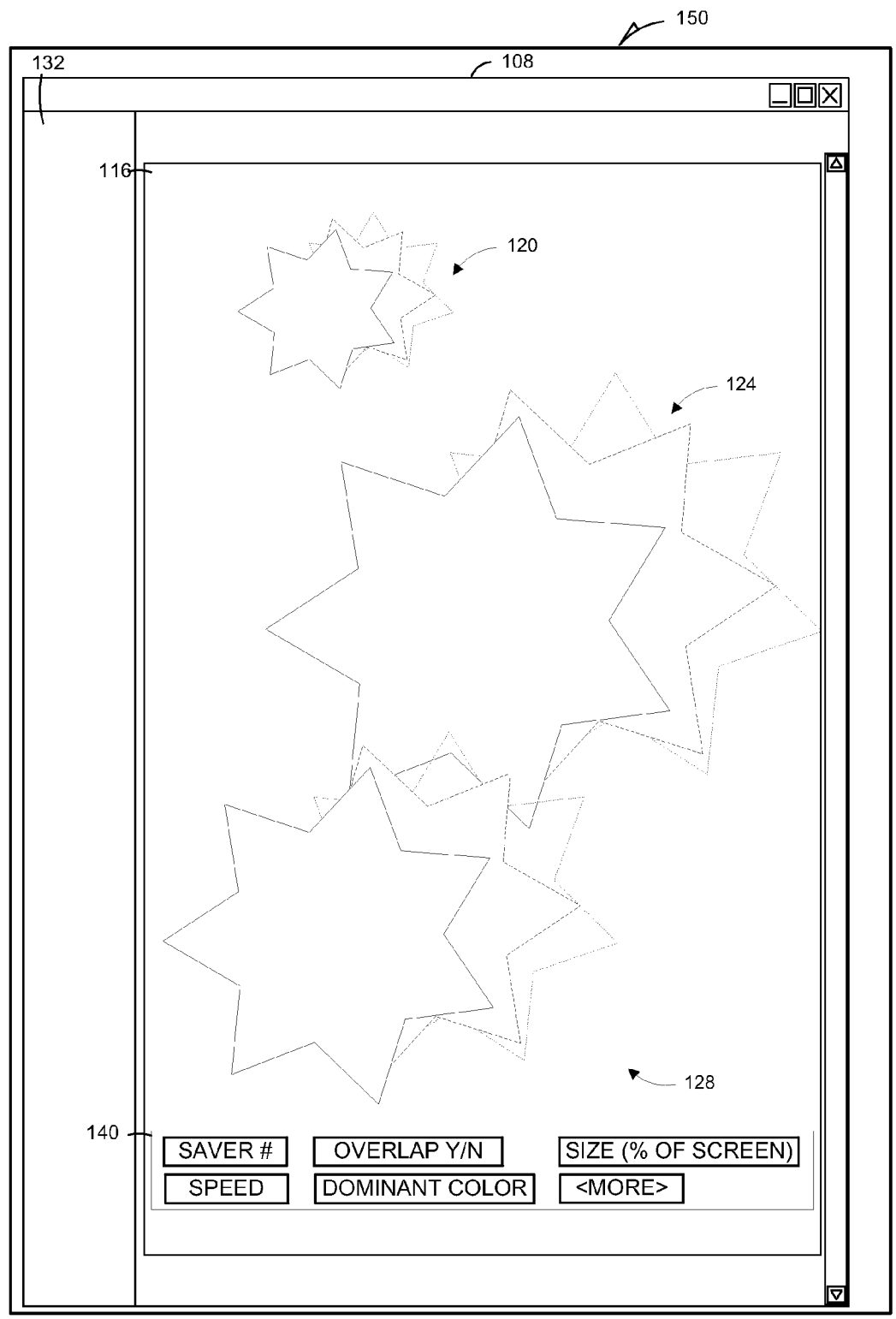
FIG. 1 illustrates the display of multiple simultaneous screen saver images according to various embodiments of the invention.

Simultaneously executing multiple instances of one or more screen saver display programs results in the display of multiple screen saver images at substantially the same time. Execution and display may be initiated under the sole control of a workstation, for example, or at a client display responsive to commands initiated by a server. These and other implementation possibilities will be described below.

As used herein, a "display compartment" is a defined area of a display surface managed by a display device that contains no more than one screen saver image at a time. When such compartments are used, the display of a screen saver image, in whole or in part, does not cross the outer boundary of the compartment.

A "display surface" is managed by a display device (e.g., a monitor, a projector, or a graphics card) when the display surface is used to present content that is visible to a human viewer according to the operational mode of the display device. In some embodiments, the display surface forms an integral part of the managing display device (e.g., this is the case in most conventional flat panel display monitors and laptop computers). In others, the display surface does not form an integral part of the managing display device (e.g., the display surface may comprise a wall or roll-up screen that reflects an image to the eyes of a user after receiving an image from the display device operating in a projection mode).

The "dominant color" of a screen saver image is the color that occupies the majority of pixels in the image at a particular moment. If an image to be generated by a particular instance of a screen saver program is assigned a dominant color, then that color will occupy a greater number of image display pixels, over a selected time period, than any other color in the image.

An "instance of a screen saver program" is a set of instructions which, when instantiated and executed, cause at least one image (a "screen saver image") to be displayed using a display device to manage a display surface in a manner that is designed to prevent burn-in of the display surface. The display of the screen saver image is initiated when no user activity in association with the display device, or another device coupled to the display device (e.g., a computer) is detected for some predetermined amount of time. The display of the screen saver image continues until it is terminated by the detection of pre-selected user activity, again in conjunction with the display device, or with a device coupled to the display device (e.g., pressing a key on a keyboard). A screen saver image is different from a banner advertisement image, for example, because a banner image is not displayed in a manner that is designed to prevent display device burn-in, nor is the display of a banner image initiated and terminated for the same reasons as a screen saver image.

Screen saver images are "separately visible" on a single display surface when at least a portion of each screen saver image can be seen at the same time.

In some embodiments, the image generated as a result of executing a first screen saver program instance may be overlaid, partially or totally, onto an image generated by a second screen saver program instance. The amount of overlay may be dynamically configurable, perhaps using a mouse to drag one image over part of another.

When a first screen saver program instance operates to generate a first image at the same time a second screen saver program instance operates to generate a second image, the images generated by these multiple screen saver program instances are displayed "substantially simultaneously" when at least a portion of the first and second images are visible at the same time.

Each separate instance of multiple screen saver programs may be separately configured and managed. For example, a group of fractal math screen saver programs might include an instance that operates to display knot-based fractals, another instance for the display of inversion fractals, and still another instance for the display of spiral fractals, and so on. Each instance can be used to generate the display of a different set of fractal images at the same time, and all images can be displayed at the same time. The images arising from each instance can be displayed in non-overlapping fashion, or with some degree of overlap.

In some embodiments, separate compartments are provided, such that each program instance generates a screen saver image display for its associated compartment, and the images for each compartment remain confined to that compartment. The display surface may be compartmented into a pre-selected arrangement of geometric shapes, or in some random manner. The selection of compartment shapes can be built into a screen saver management program, or provided by the user. Fixed shapes, shapes that vary over time, or shapes drawn by a user can all be used, either separately, or in combination.

User activity can affect the characteristics of multiple screen saver image display. For example, if previously-specified user activity is detected in conjunction with an executing screen saver program instance, or a display compartment (e.g., by receiving an indication that mouse hover activity is occurring over an image or a compartment), that compartment or the screen saver image may be magnified to some degree. In some embodiments, clicking on the image results in magnification by X % (e.g., 125% or 150%), with another click on the image further increasing magnification to Y % (e.g., 200% or 300%). A third click might operate to restore the image to its regular size. Perhaps in such embodiments a key press from a keyboard is used to indicate that the execution of the screen saver instances (and thus display of the images) is to be terminated.

Screen saver instances can be randomly assigned to compartments, or assigned by the user. Screen saver instances may also cycle through a single compartment, or multiple compartments, so that a succession of screen saver instances generates different images for a single compartment, or similar images that move through multiple compartments, if desired.

To provide multiple instance execution, a different instance of the same program may be executed, or one instance of different programs may be executed. Combinations of these approaches may be used (e.g., executing two instances of one program, and three of another). In some embodiments, images may be dynamically dragged from one compartment, and dropped into another.

The dominant color of a generated screen saver image can be set randomly, or by user selection. Compartments may also be grouped according to their dominant colors, so that a wide variety of arrangements can be made. For example, to simulate the order of colors in the national flag of India, a user might request three horizontal rows of three compartments each, stacked on top of one another to cover a display surface. The top row might be dominated by a saffron color, the middle row by a white/gray color scheme, and the bottom row by a green color.

Keys on a keyboard might be assigned to transition dominant colors through a single compartment, or from compartment to compartment. For example, pressing the "F7" key on the user keyboard might begin a transition through the colors of the rainbow, from violet to red, in one or all compartments, or the rainbow of colors might move in sequence from one compartment to the next. Pressing the "F8" key might operate to end the color transition sequence.

The output of one or more screen saver program instances can be buffered for later display. This stored output can then be played back at higher or lower speeds than the speed at which image generation originally occurred, or perhaps interspersed with other image displays as part of a sequence of images. Keys on a user keyboard can be assigned to increasing and decreasing the speed of image display and/or sequencing. The user may also elect to initiate recording one or more image sequences when pre-selected dominant colors or display speeds are detected, or by simple manual selection—perhaps by clicking a mouse to use the displayed cursor for selecting one or more of the images on the display surface.

In some embodiments, the option of voting for screen saver images can be presented. Thus, when a user experiences a pleasing display output, a positive vote can be registered, perhaps using a mouse or other input device, such as the keyboard. When the display output is not pleasing, a negative vote can be registered in the same way. The voting results can be used to direct the screen saver display manager to make use of screen saver program instances that generate images having characteristics in common with those that have received positive votes. The voting results, including common characteristics, can be displayed to the user, and/or exported to another display device for use at a different location.

Many other options are available. For example, the images resulting from execution of the plurality screen saver program instances may be rotated at selected or random speeds, twisted, inverted, or displayed using various visual effects, such as limiting the display to black and white images, sepia coloration, or solarization of the images. Configuration may be random, pre-selected by the user, or dynamic—as the images are generated. In some cases, the images may be partitioned, with discrete parts of a single image displayed in sequence. In others, panning may be used to continuously display a single image, perhaps using a "flashlight" effect that pans a small display window across a larger, integrated image.

Embodiments of the invention can be implemented in a variety of architectural platforms, operating and server systems, devices, systems, and applications. Any particular architectural layout or implementation presented herein is thus provided for purposes of illustration and comprehension only, and is not intended to limit the various embodiments.

FIG. 1 illustrates the display of multiple simultaneous screen saver images 120, 124, 128 according to various embodiments of the invention.

The GUI 108, which may comprise a client GUI displayed on a display surface 150 (e.g., a touch surface or a flat panel display), shows an example of a window 116 that may be displayed by a rendering program to present renderings of multiple screen saver images 120, 124, 128.

Here it can be seen that three instances of the same screen saver program are executing at the same time, resulting in the generation of the three separately visible images 120, 124, 128. Each instance is separately configured and managed using the menu 140. Thus, the image 120 has been configured so that it does not overlay any other images, and is sized to occupy less of the display surface 150 than the other images 124, 128.

As a matter of contrast, the images 124 and 128 overlap each other to some extent, which may be a random amount, or selected by the user. The menu 140 can likewise be used to select the characteristics of the images 124, 128.

In the lower portion of the window 116, the menu 140 provides widgets to configure the images 120, 124, 128. For example, a mouse click on the widget labeled SAVER # can be used to cycle through each of the displayed images, so that the other menu items can be applied to a particular instance of the screen saver program responsible for generating the designated image.

Thus, the user may elect to permit the designated image to overlap others by selecting the widget marked OVERLAP Y/N. The user may delineate some amount of the screen to be occupied by a particular image, using the widget marked SIZE. The speed at which a displayed image moves or changes may be adjusted by selecting the widget labeled SPEED. Similarly, the dominant color of a particular image can be affected by selecting the widget labeled DOMINANT COLOR. Each widget may lead to sub-menus for refining a particular selection, and the widget labeled <MORE> may be used to access still further configuration selections, such as the use of image surface display compartments, image sequencing, voting, and exporting screen saver management settings to other display devices or computers. The sidebar 132 may also be used to display configuration options.

Figure 2:
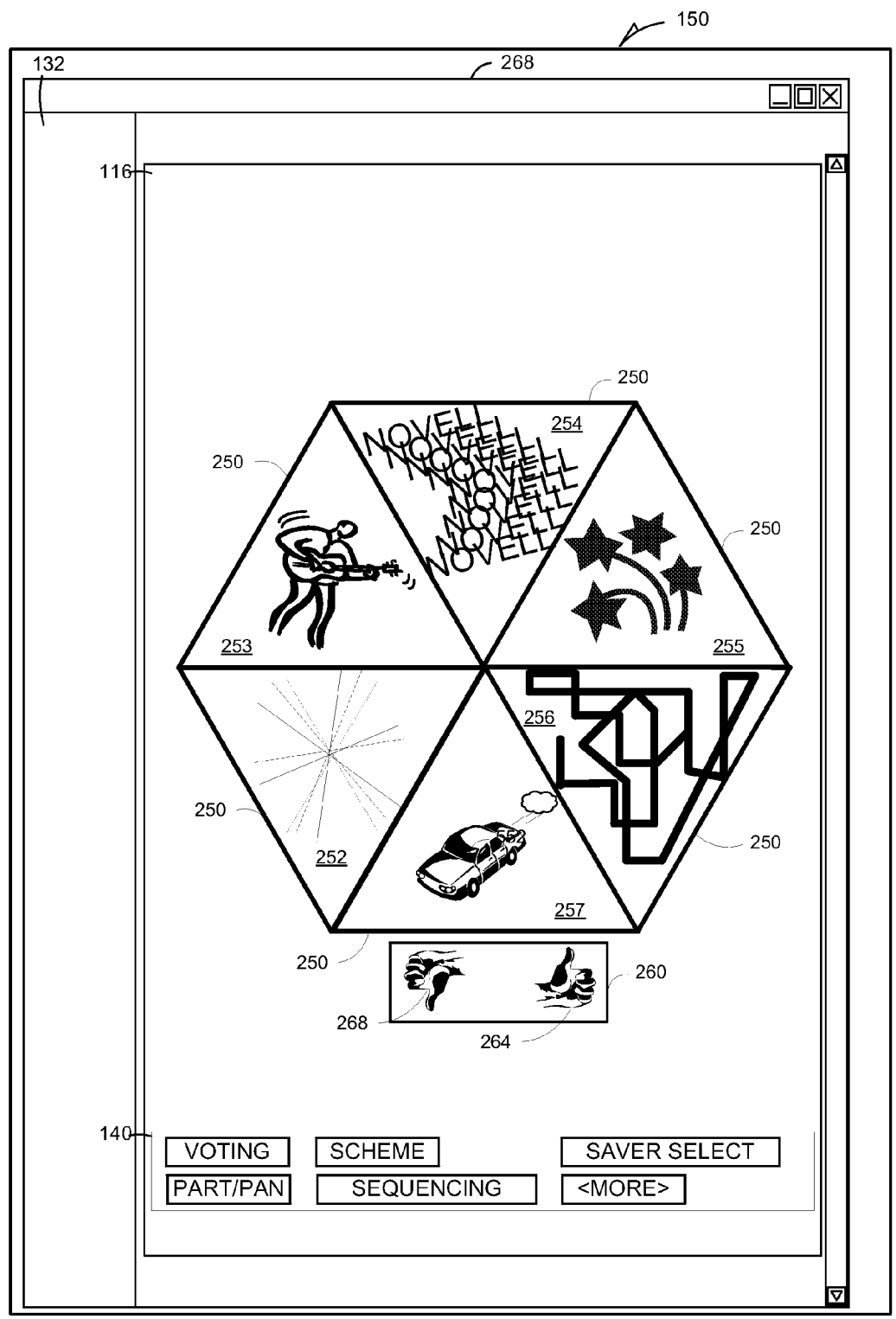
FIG. 2 illustrates the display of multiple simultaneous screen saver images, using display compartments, according to various embodiments of the invention.

FIG. 2 illustrates the display of multiple simultaneous screen saver images 252, 253, 254, 255, 256, 257, using display compartments 250, according to various embodiments of the invention. Here it can be seen that six different screen saver program instances are executing at the same time, resulting in the simultaneous generation of the six different images 252, 253, 254, 255, 256, 257. Each instance is separately configured and managed using the menu 140. Since compartments 250 are used to contain each of the images 252, 253, 254, 255, 256, 257, the visual extent of each image is governed by the compartment boundaries.

In the lower portion of the window 116, the menu 140 provides widgets to configure the images 252, 253, 254, 255, 256, 257. For example, a mouse click on the widget labeled VOTING can be used to display the voting entry field 260, with an approval sub-field 264, and a rejection sub-field 268. Selection of either the approval sub-field 264, or the rejection sub-field 268 can be used to build a database of preferences with respect to image characteristics (in this case, with respect to image 257) that can be used to guide the generation of images in the future that share the same or similar characteristics.

Other menu selection items include a widget marked SCHEME to select a color scheme for one or more of the compartments. That is, a user may specify the dominant color for images in a certain compartment, as well as multiple colors in a scheme for such images, so that images in one or more compartments are generated with a fixed percentage or number of pixels of various colors in the scheme.

The widget labeled SAVER SELECT can be used to select from a variety of screen saver programs that are to be used for each instance that is executed. The widget labeled PART/PAN can be used to select whether images in a compartment will be partitioned, or panned. The widget labeled SEQUENCING can be used to select how instances are sequenced through multiple compartments 250, or a single compartment 250. The widget labeled <MORE> can be used to lead to still further menu 140 options. Thus, many embodiments may be realized.

Figure 3:
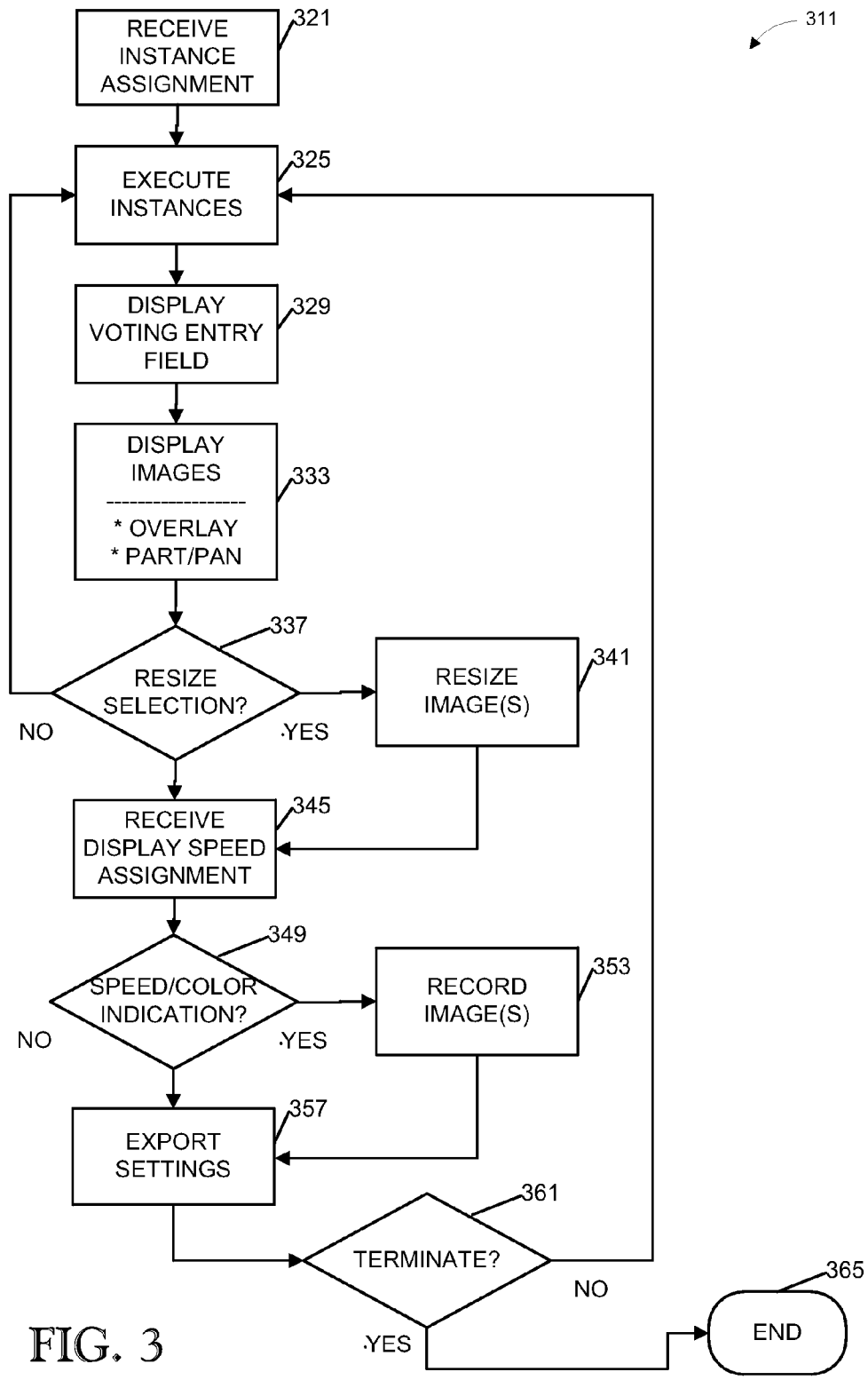
FIG. 3 is a flow diagram illustrating a variety of methods according to various embodiments of the invention.

For example, FIG. 3 is a flow diagram illustrating several methods 311 according to various embodiments. The methods 311 are implemented in a machine-accessible and readable medium, and are operational over processes within and among networks. The networks may be wired, wireless, or a combination of wired and wireless. The methods 311 may be implemented as instructions, which when accessed by a machine, cause the machine to perform the processing and image display depicted and described with respect to FIGS. 1-2.

Thus, in some embodiments, a computer-implemented method 311 of displaying multiple screen saver images may begin at block 321 with receiving at least one of a random assignment or a user-selected assignment corresponding to selecting at least one of the plurality of screen saver program instances. In this way, one or more of the screen saver program instances to be executed can be manually or automatically selected. Any of the instances can be randomly assigned, or user-selected; in some cases, randomly assigned instances can execute side-by-side with user-selected instances.

The method 311 may continue on to block 325 with executing a plurality of screen saver program instances to display a plurality of separately visible screen saver images using a single display device at substantially the same time. As noted previously, the plurality of screen saver program instances may comprise separate instances of the same set of instructions, or different sets of instructions. In either case, the result of executing multiple instances is the eventual independent and simultaneous display of multiple screen saver images (see block 333). A dominant color can be selectively assigned to any one or more of the images using a random assignment, a user-selected assignment, or a combination of both. The dominant color can be assigned during the time of continuous image display, or when the images are not displayed, as desired.

The method 311 may continue on to block 329 with displaying a voting entry field associated with the at least one of the plurality of screen saver images. The voting entry field may comprise either one, or both, of an approval sub-field and a rejection sub-field.

The method 311 may go on to block 333, with displaying a plurality of screen saver images corresponding to the plurality of executing screen saver program instances. The images may be displayed apart from each other, or overlaid on top of one another. Thus, the method 311 may include displaying at least one of the plurality of screen saver images over at least a part of another one of the plurality of screen saver images. Whether the images are overlaid or not, at least a portion of each image will be visible to a user at any given time while the screen saver program instances are executing.

Screen saver images that are larger than the available or allocated display surface area can be handled in different ways. In some embodiments, the method 311 at block 333 may include displaying discrete portions of at least a part of one of the plurality of distinct instances in a sequence. For example, a single image may be divided into four discrete parts, with each part displayed individually, in sequence. In this way, larger screen saver images can be partitioned into smaller portions, and the portions can be displayed in the available or allocated display surface space.

In some embodiments, the method 311 at block 333 may include displaying at least a part of one of the plurality of distinct images in a continuously panned sequence. In this way, larger screen saver images can be displayed as a continuously scanned segment, moving from one end of the image to the other, perhaps by panning a smaller viewport (e.g., a display compartment) from left to right and top to bottom across the entire image.

If in indication of an appropriate user selection with respect to a particular screen saver image is received at block 337 (e.g., a menu selection or input device hover activity), the method 311 may go on to block 341 to include resizing the screen saver image associated with one of the plurality of screen saver program instances in response. This is because some embodiments permit the screen saver images to be resized at will, such that the images can be magnified, reduced, and/or have their borders redrawn. The borders may be invisible, as shown in FIG. 1, or visible, as when display compartments are used, shown in FIG. 2.

In some embodiments, the method 311 may include, at block 345, receiving one of a random assignment or a user-selected assignment of a display speed associated with at least one of the plurality of screen saver program instances. In this way, the speed of image display for each screen saver program instance may be specified, either randomly, or via user-selection.

If an indication is received that at least one of a display speed or a dominant color match predetermined display criteria with respect to one of the screen saver images at block 349, then the method 311 may go on to include recording at least the one of the screen saver images at block 353. In this way, the recording of one or more screen saver images can be triggered by certain display speeds, and/or the appearance of pre-selected dominant colors.

The method 311 may go on to block 357 to include exporting, from a first computer to a second computer, a group of screen saver management settings to determine the sequence of display for the images. The settings that regulate how multiple screen saver images are displayed can thus be communicated from one computer to another, to be reused as desired.

The method 311 may go on to block 361 with determining whether execution (and therefore image display) activity of the screen saver programs should be terminated. If no appropriate user or device activity is detected (e.g., the press of a key on a keyboard, or receipt of an email message), then execution will continue at block 325. Otherwise, the execution of the plurality of screen saver program instances will terminate at block 365. Still further embodiments may be realized.

Figure 4:
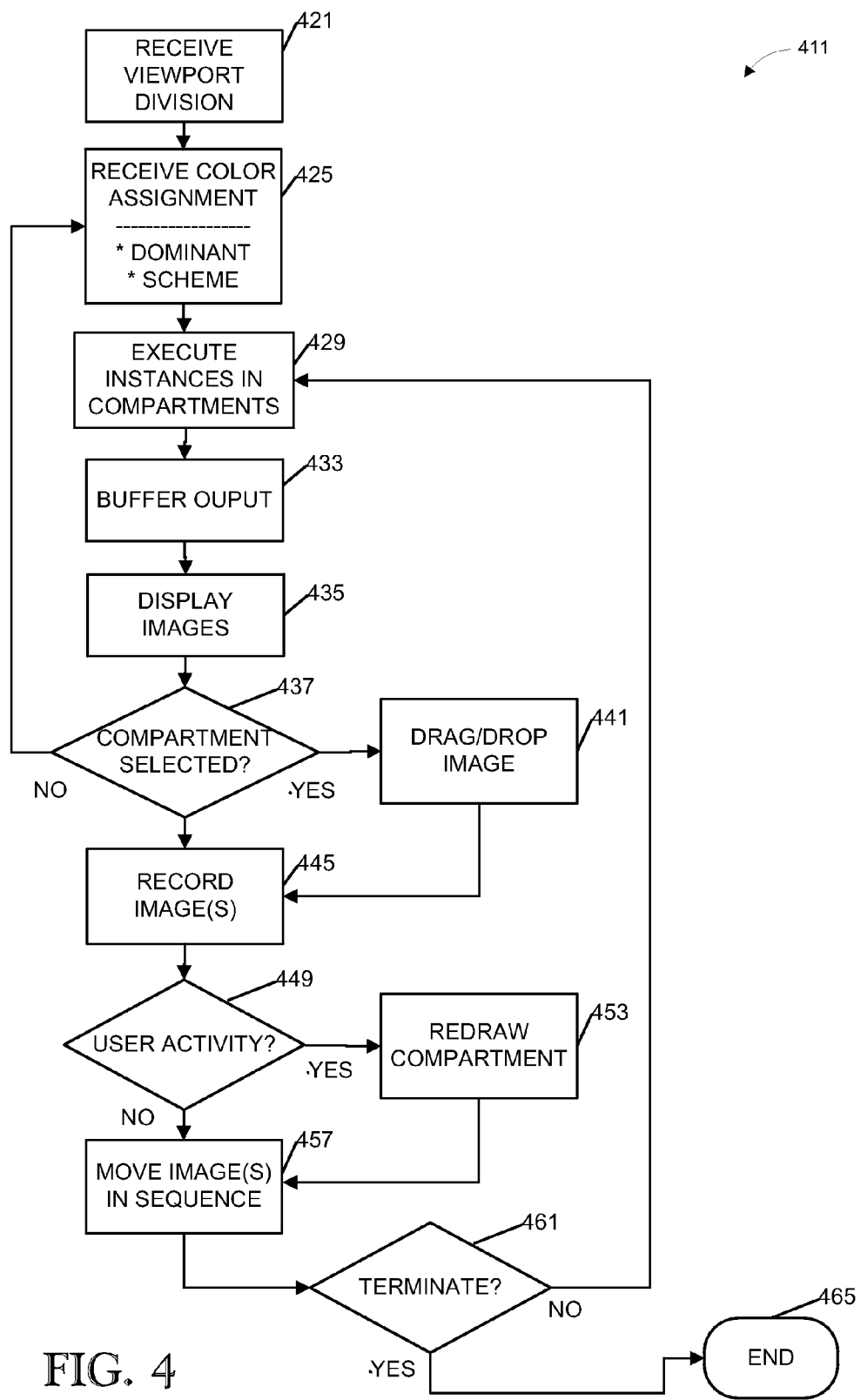
FIG. 4 is a flow diagram illustrating additional methods according to various embodiments of the invention.

For example, FIG. 4 is a flow diagram illustrating additional methods 411 according to various embodiments of the invention. The methods 411 are implemented in a machine-accessible and readable medium, and are operational over processes within and among networks. The networks may be wired, wireless, or a combination of wired and wireless. The methods 411 may be implemented as instructions, which when accessed by a machine, cause the machine to perform the processing and image display depicted and described with respect to FIGS. 1-2.

In some embodiments, a computer-implemented method 411 of displaying multiple screen saver images may begin at block 421 with receiving one of a random assignment or a user-selected assignment to divide a display surface managed by display device into display compartments. Thus, the available or allocated viewing surface can be divided into compartments according to a user selection, or randomly. The display surface may form an integral part of the display device, or be located so as to remotely receive an image provided by the viewing device, such as when a remote monitor, or a projection screen, etc. are used.

The method 411 may continue on to block 425 with receiving one of a random assignment or a user-selected assignment of a dominant color to at least one of the display compartments. In this way, each compartment can be assigned a dominant color, wherein the assigned color is used in more pixels in that compartment than other colors in the same compartment.

A color scheme, comprising more than one color, can also be assigned to the compartments. For example, the method 411 may include, at block 425, receiving a color scheme assignment, including a dominant color, to the at least one of the display compartments. In this case, a color scheme that comprises at least two colors can be assigned to an individual compartment. The colors that form the scheme can be designated according to their order of dominance over each other, and over all other colors used in a compartment. For example, one scheme might be specified as: red=40% of pixels, blue=20% of pixels, and green=20% of pixels; the other 20% of pixels might be assigned randomly from a user-selected palette. Other schemes may be selected.

The method 411 may continue on to block 429 with executing a plurality of screen saver program instances to display a plurality of separately visible screen saver images in a corresponding plurality of non-overlapping display compartments using a single display device at substantially the same time.

In some embodiments, the method 411 may include, at block 433, buffering the output of one or more of the plurality of screen saver program instances to provide a stored record that can be replayed at a selected speed during the image display activity, which occurs at block 435 of the method 411. The initiation of image display may occur locally or remotely. Thus, the method 411 may include, at block 435, prompting the activity of executing the screen saver program instances at a client device from a server device.

If a first indication of a user selection associated with a first display compartment is received, as determined at block 437, then the method 411 may go on to block 441 to include dragging one of the plurality of images from the first display compartment and dropping the image that was dragged into a second display compartment, selected randomly, or perhaps as indicated by a second user selection. In this way, screen saver images can be dragged from one compartment, and dropped into another, at will.

The method 411 may go on to include, at block 445, recording at least one of the plurality of screen saver images associated with at least one of the plurality of screen saver program instances. In this way, the images of selected compartments can be saved for later playback, if desired.

In some embodiments, the method 411 may include detecting a pre-selected type of user activity (e.g., a user input device selection, such as a mouse click and movement near one of the display compartments) at block 449, and in response, redrawing the compartment boundary of the selected display compartments according to the user activity at block 453.

Compartments can be redrawn prior to image display, or during the display of images. Thus, the shape of any one or more of the compartments can be determined in response to user manipulation of compartment boundaries while the images are continuously displayed, or during a time when no images are displayed. The user manipulation may be detected by receiving information corresponding to cursor movement or some other indication that one or more of the boundaries are to be dragged across a display surface managed by the display device.

The method 411 may continue on to block 457 with moving one or more of the plurality of screen saver images from being displayed in one of the display compartments to being displayed in another of the display compartments as part of a timed movement sequence. In this way, the screen saver images can move from one compartment to another, according to an assigned schedule. Screen saver images (as generated by multiple screen saver program instances) can also be sequenced within a single compartment.

The method 411 may go on to block 461, with determining whether execution (and therefore image display) activity of the screen saver programs should be terminated. If no appropriate user or device activity is detected (e.g., the press of a key on a keyboard, or receipt of an email message), then execution will continue at block 429. Otherwise, the execution of the plurality of screen saver program instances will terminate at block 465.

The methods described herein do not have to be executed in the order described, or in any particular order. Moreover, various activities described with respect to the methods identified herein can be executed in repetitive, looped, serial, or parallel fashion. The individual activities of the methods shown in FIGS. 3 and 4 can also be combined with each other and/or substituted, one for another, in various ways. Information, including parameters, commands, operands, and other data, can be sent and received in the form of one or more carrier waves.

Figure 5:
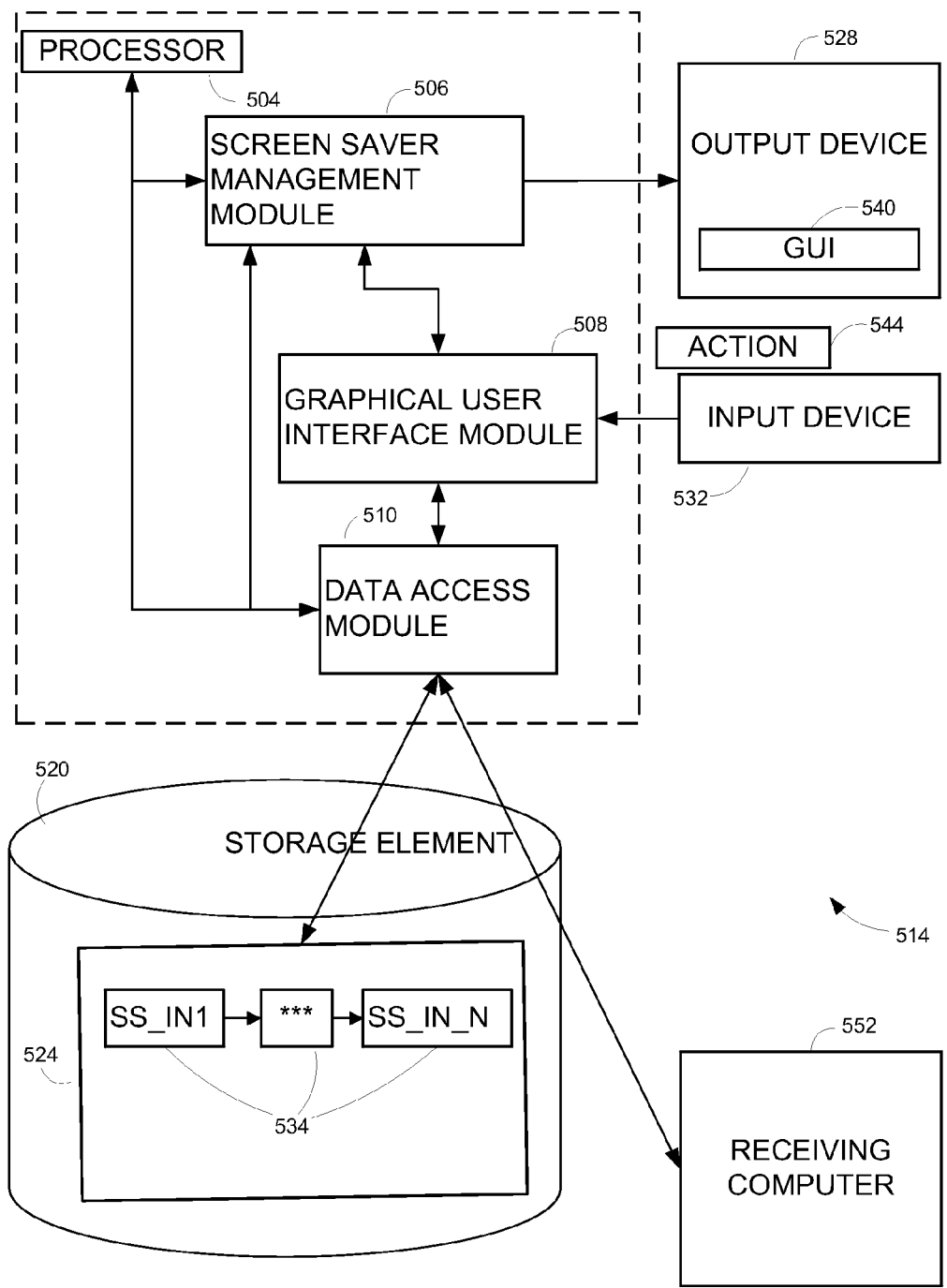
FIG. 5 is a block diagram of an apparatus and system to display multiple simultaneous screen saver images according to various embodiments of the invention.

FIG. 5 is a block diagram of an apparatus 514 and system 500 to display multiple simultaneous screen saver images according to various embodiments of the invention. The apparatus 514 and system 500 may be implemented in a machine-accessible and readable medium and is operational over one or more networks. The networks may be wired, wireless, or a combination of wired and wireless. The apparatus 514 and system 500 implement, among other things, the processing associated with the displays of FIGS. 1 and 2, and the methods 311 and 411 of FIGS. 3 and 4, respectively. Modules may comprise hardware, software, and firmware, or any combination of these. Additional embodiments may be realized.

The system 500 may include a number of modules such as one or more processors 504, a screen saver management module 506, a GUI module 508 and a data access module 510. The screen saver management module 506 and the GUI module 508 may take the form of an integral module, or exist as separate modules, as shown. These modules may be associated within an apparatus 514, such as a personal digital assistant (PDA), laptop computer, personal computer, workstation, client, server, or any other machine, as indicated by their containment within the dashed box.

In order to avoid obscuring the components of FIG. 5, connecting lines between each of the elements within the apparatus 514 have not been shown. However, those of ordinary skill in the art will understand that any of the individual elements shown to be located within the confines of the apparatus 514 may be operably coupled to any other element within the apparatus 514. Similarly, those of ordinary skill in the art will understand that any of the components shown to be located within the confines of the apparatus 514 may also be located outside the apparatus 514, and appropriately coupled to the apparatus 514 via wired or wireless networks or other interface mechanisms.

The data access module 510 may be used by the screen saver management module 506 to access a storage element 520, such as a database, a memory, a disk, or other storage device. The storage element 520 may serve to contain one or more items having electronic content 524, such as screen saver management preference data, and other data, such as instructions comprising a plurality of screen saver programs 534. The data access module 510 may operate to read from and/or write to the electronic content 524 and may provide reading and writing services for the benefit of other system modules, including the GUI module 508, the screen saver management module 506, and the processor 504. The preference data and other data 534 may be transferred to others devices, such as a receiving computer 552.

The data access module 510 may be present in some embodiments, and absent in others. When present, the data access module 510 may operate as a mediator between the various components of the system 500 and the electronic content 524. For example, the storage element 520 may be included in a remote server.

The screen saver management module 506 may be operably coupled to an output device 528, such as a publication server, client device, display device (e.g., monitor, projector, video card, etc.), printer, or loudspeaker, among others. The output device 528 may be used for presenting renderings of the output generated by the instructions 534. Rendering may take the form of displaying screen saver images, as described previously. The GUI module 508 may be operably connected to the screen saver management module 506 and the data access module 510.

The GUI module 508 may receive user activity input 544 from a variety of input devices 532 (e.g., a keyboard, a mouse, a trackball, voice recognizer, touch pad, touch screen, etc.). Such devices 532 may include one or more reporting devices, such as smart meters, client devices (e.g., desktop or laptop computers), servers, and other devices. Thus, many embodiments may be realized.

For example, an apparatus 514 to display multiple screen saver images, perhaps as part of a graphical user interface 540, may comprise one or more processors 504, an output device 528, and a memory (e.g., in the form of a storage element 520) to store instructions which, when executed by the processor 504, result in displaying at least one screen saver image using the output device 528. The apparatus 514 may further include a screen saver management module 506 to manage execution of a plurality of screen saver program instances to display, using the output device 528, a plurality of separately visible screen saver images at substantially the same time.

The display speed associated with any one or more of the screen saver program instances can be independently regulated by the screen saver management module 506 according to a user-specified frame rate. The user-specified frame rate can be selected by a user during the time the images are continuously displayed, or during a time when the images are not displayed.

The output device 528 may comprise a surface display (e.g., where images are displayed directly on a surface of the device, as occurs with most local monitors), or a projection display, among others. The apparatus 514 may include one or more user input devices 532 to provide an indication that the display of the screen saver images is to be terminated. Still further embodiments may be realized.

Figure 6:
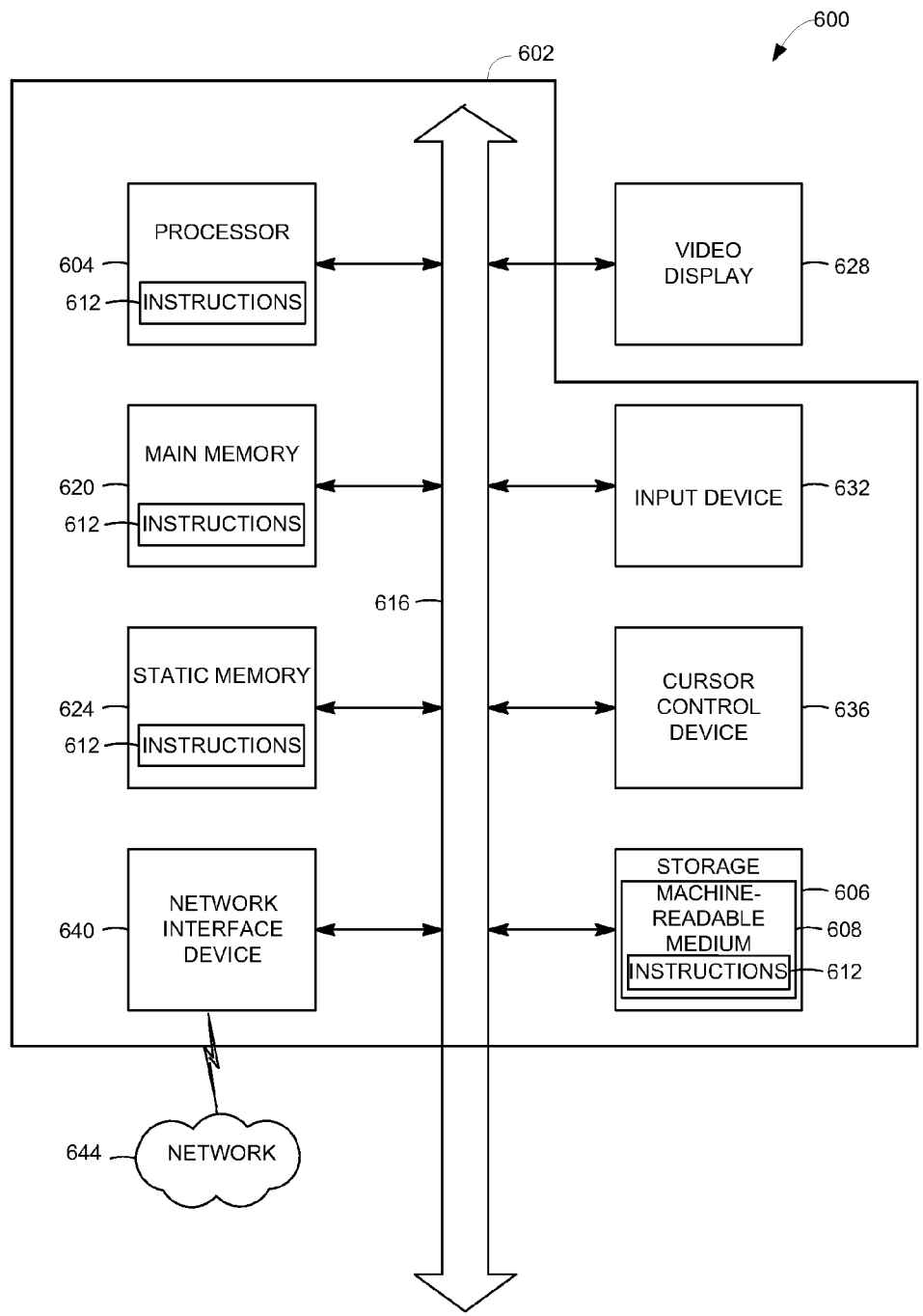
FIG. 6 is a block diagram of an article of manufacture, including a machine, according to various embodiments of the invention.

For example, FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

The machine 602 may take the form of a computer system having a processor 604 coupled to a number of components directly, and/or using a bus 616. Thus, the machine 602 may be similar to or identical to the apparatus 514 or system 500 shown in FIG. 5.

Turning now to FIG. 6, it can be seen that the components of the machine 602 may include main memory 620, static or non-volatile memory 624, and mass storage 606. Other components coupled to the processor 604 may include an input device 632, such as a keyboard, a cursor control device 636, such as a mouse. An output device 628, such as a video display, may be located apart from the machine 602 (as shown), or made as an integral part of the machine 602.

A network interface device 640 to couple the processor 604 and other components to a network 644 may also be coupled to the bus 616. The instructions 612 may be transmitted or received over the network 644 via the network interface device 640 utilizing any one of a number of well-known transfer protocols (e.g., HyperText Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In some embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

For example, in some embodiments, the instructions 612 may cause the machine to execute a computer-implemented method of executing a plurality of screen saver program instances to display a plurality of separately visible screen saver images using a single display device at substantially the same time. A dominant color may be selectively assigned to any one or more of the images using a random assignment, a user-selected assignment, or come combination of both.

Further activities may include detecting activity by a user (e.g., cursor movement activity), and redrawing, according to the activity, a compartment boundary of at least one of a plurality of compartments into which a display surface is divided, wherein the compartment boundary limits display coverage of at least one of the screen saver images. Additional activity may include prompting execution of the screen saver program instances locally, or remotely, such as at a client device from a server device. In this way, a server can manage the initiation and termination of executing multiple screen saver program instances on a client device.

While the machine-readable medium 508 is shown as a single medium, the term "machine-readable medium" should be taken to include a single medium or multiple media (e.g., a centralized or distributed database, and/or associated caches and servers, and or a variety of storage media, such as the registers of the processor 504, memories 520, 524, and or the storage device 506 that store the one or more sets of instructions 512. The term "machine-readable medium" shall also be taken to include any medium that is capable of storing, encoding or carrying a set of instructions for execution by the machine and that cause the machine 502 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may thus provide additional flexibility with respect to screen saver implementation. Increased user satisfaction may result.

Various embodiments may be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Some embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   detecting cursor movement activity by a user;
   redrawing, according to the activity, a compartment boundary of at least one of a plurality of compartments into which a display surface is divided, wherein the compartment boundary limits display coverage of at least one of the screen saver images;
   executing a plurality of screen saver program instances to display a plurality of separately visible screen saver images using a single display device at substantially the same time, wherein at least one of a speed of display or a dominant color is selectively assigned to at least one screen saver image of the plurality of separately visible screen saver images using one of a random assignment or a user-selected assignment; and
   recording at least one portion of the at least one screen saver image for later playback while the at least one screen saver image is displayed via the single display device, wherein the recording is performed responsive to receiving an indication that the at least one of the speed of display or the dominant color of the at least one screen saver image being displayed matches a predetermined display criteria.

2. The method of claim 1, comprising:
   displaying a voting entry field associated with the at least one screen saver image, wherein the voting entry field comprises at least one of an approval sub-field or a rejection sub-field.

3. The method of claim 1, wherein the dominant color can be selectively assigned during a time of continuously displaying the plurality of separately visible screen saver images or during a time when the plurality of separately visible screen saver images are not displayed.

4. The method of claim 1, comprising:
   receiving at least one of a random assignment or a user-selected assignment corresponding to a selection of at least one of the plurality of screen saver program instances.

5. The method of claim 1, comprising:
   resizing a screen saver image associated with one of the plurality of screen saver program instances in response to receiving an indication of a user selection with respect to the screen saver image associated with the one of the plurality of screen saver program instances.

6. The method of claim 1, comprising:
   receiving one of a random assignment or a user-selected assignment of a display speed associated with at least one of the plurality of screen saver program instances.

7. The method of claim 1, comprising:
   exporting, from a first computer to a second computer, a group of screen saver management settings to determine a sequence of the display.

8. The method of claim 1, further comprising:
   displaying at least one of the plurality of separately visible screen saver images over at least a part of another one of the separately visible plurality of screen saver images.

9. The method of claim 1, further comprising:
   displaying discrete portions of at least a part of one of the plurality of distinct instances in a sequence.

10. The method of claim 1, further comprising:
    displaying at least a part of one of the plurality of distinct images in a continuously panned sequence.

11. The method of claim 1, wherein the at least one portion of the at least one screen saver image is recorded in a memory associated with the single display device.

12. A method, comprising:
    executing a plurality of screen saver program instances to display a plurality of separately visible screen saver images in a corresponding plurality of non-overlapping display compartments using a single display device at substantially the same time, wherein a shape of at least one of the display compartments is determined in response to user manipulation of compartment boundaries while the plurality of separately visible screen saver images are continuously displayed;
    moving at least one of the plurality of separately visible screen saver images from being displayed in one of the display compartments to being displayed in another of the display compartments as part of a timed movement sequence; and
    recording at least one portion of one or more screen saver images of the plurality of separately visible screen saver images for later playback while the one or more screen saver images are displayed via the single display device, wherein the recording is performed responsive to receiving an indication that at least one of a speed of display or a dominant color of a corresponding screen saver image of the one or more screen saver images being displayed matches a predetermined display criteria.

13. The method of claim 12, comprising:
    receiving one of a random assignment or a user-selected assignment to divide a display surface managed by the display device into the display compartments.

14. The method of claim 12, comprising:
    receiving one of a random assignment or a user-selected assignment of a dominant color to at least one of the display compartments.

15. The method of claim 12, further comprising:
    receiving a color scheme assignment, including a dominant color, to the at least one of the display compartments.

16. The method of claim 12, comprising:
    receiving a first indication of a user selection associated with a first one of the display compartments; and
    dragging one of the plurality of images from the first one of the display compartments and dropping the one of the plurality of images into a second one of the display compartments according to a second indication of a user selection.

17. The method of claim 12, comprising:
    prior to the display, buffering output of at least one of the plurality of screen saver program instances to provide a stored record that can be replayed at a selected speed during the display.

18. The method of claim 12, wherein the user manipulation comprises cursor movement indicating the boundaries are to be dragged across a display surface managed by the display device.

19. An apparatus comprising:
a processor;
a display device;
a memory to store instructions which, when executed by the processor, result in displaying at least one screen saver image using the display device; and
a screen saver management module to:
detect cursor movement activity by a user;
redraw, according to the activity, a compartment boundary of at least one of a plurality of compartments into which a display surface is divided, wherein the compartment boundary limits display coverage of at least one of the screen saver images;
manage execution of a plurality of screen saver program instances to display, using the display device, a plurality of separately visible screen saver images, including the at least one screen saver image, at substantially the same time, wherein a display speed associated with any one or more of the screen saver program instances can be independently regulated by the screen saver management module according to a user-specified frame rate; and
record at least one portion of the at least one screen saver image for later playback while the at least one screen saver image is displayed via the display device, wherein the recording is performed responsive to receiving an indication that at least one of a speed of display or a dominant color of the at least one screen saver image being displayed matches a predetermined display criteria.

20. The apparatus of claim 19, wherein the display device comprises:
one of a surface display and a projection display.

21. The apparatus of claim 19, further comprising:
a user input device to provide an indication that the display of the at least one screen saver image is to be terminated.

22. The apparatus of claim 19, wherein the user-specified frame rate can be selected by a user during a time of continuously displaying the images or during a time when the images are not displayed.

23. A non-transitory machine-readable storage medium having instructions stored thereon that, when executed by a machine, cause the machine to perform operations comprising:
detecting cursor movement activity by a user;
redrawing, according to the activity, a compartment boundary of at least one of a plurality of compartments into which a display surface is divided, wherein the compartment boundary limits display coverage of at least one of the screen saver images;
executing a plurality of screen saver program instances to display a plurality of separately visible screen saver images using a single display device at substantially the same time, wherein at least one of a speed of display or a dominant color is selectively assigned to at least one screen saver image of the plurality of separately visible screen saver images using one of a random assignment or a user-selected assignment; and
recording at least one portion of the at least one screen saver image for later playback while the at least one screen saver image is displayed via the single display device, wherein the recording is performed responsive to receiving an indication that the at least one of the speed of display or the dominant color of the at least one screen saver image being displayed matches a predetermined display criteria.

24. The non-transitory machine-readable storage medium of claim 23, wherein the operations further comprise:
prompting the executing at a client device from a server device.

* * * * *